3 Sheets—Sheet 1.

H. A. HENDERSON.

Assignor, by mesne assignments, to THE NATIONAL HEELING MACHINE COMPANY.

HEEL NAILING MACHINE.

No. 10,589. Reissued Apr. 28, 1885.

WITNESSES
Fred Harris
Fred. B. Dolan.

INVENTOR
Henry A. Henderson
by his attys
Clarke & Raymond.

N. PETERS, Photo-Lithographer, Washington, D. C.

H. A. HENDERSON.

Assignor, by mesne assignments, to THE NATIONAL HEELING MACHINE COMPANY.

HEEL NAILING MACHINE.

No. 10,589. Reissued Apr. 28, 1885.

WITNESSES

Fred. Harris

Fred. B. Dolan

INVENTOR

Henry A. Henderson by his attys

Clarke & Raymond

N. PETERS, Photo-Lithographer, Washington, D. C.

H. A. HENDERSON.

Assignor, by mesne assignments, to THE NATIONAL HEELING MACHINE COMPANY.

HEEL NAILING MACHINE.

No. 10,589. Reissued Apr. 28, 1885.

WITNESSES

Fred. Harris

Fred. P. Dolan.

INVENTOR

Henry A. Henderson by his attys

Clarke & Raymond.

N. PETERS, Photo-Lithographer, Washington, D. C.

UNITED STATES PATENT OFFICE.

HENRY A. HENDERSON, OF LYNN, MASSACHUSETTS, ASSIGNOR, BY MENSE ASSIGNMENTS, TO THE NATIONAL HEELING MACHINE COMPANY, OF PORTLAND, MAINE.

HEEL-NAILING MACHINE.

SPECIFICATION forming part of Reissued Letters Patent No. 10,589, dated April 28, 1885.

Original No. 259,687, dated June 20, 1882. Application for reissue filed December 4, 1883.

*To all whom it may concern:*

Be it known that I, HENRY A. HENDERSON, of Lynn, in the county Essex and State of Massachusetts, a citizen of the United States, have invented a new and useful Improvement in Heel-Nailing Machines, of which the following is a full, clear, and exact description, reference being had to the accompanying drawings, forming a part of this specification, in explaining its nature, in which—

Figure 1:
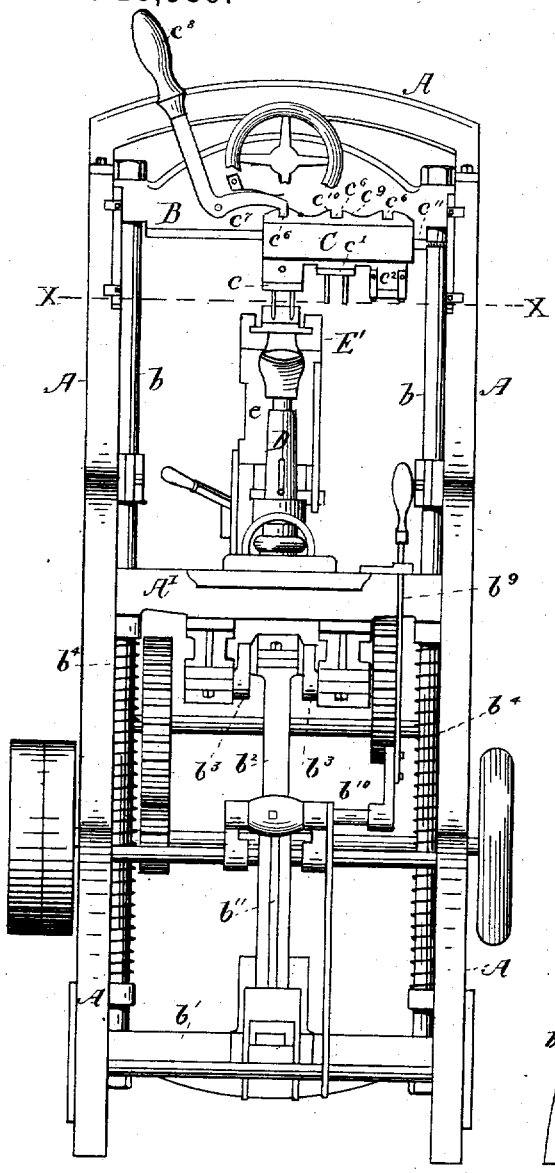
Figure 2:
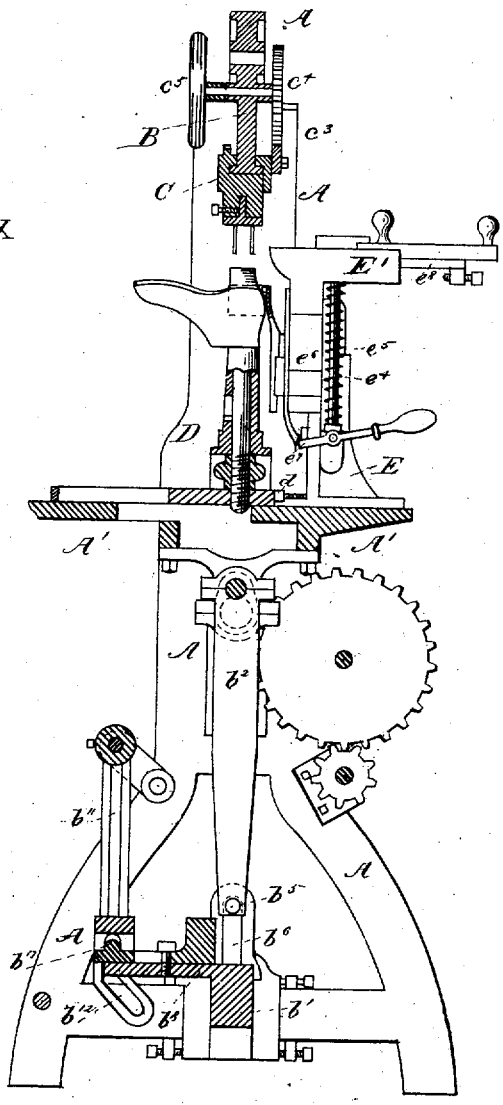
Figure 3:
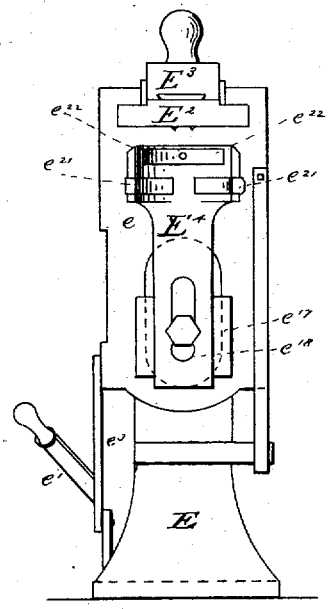
Figure 4:
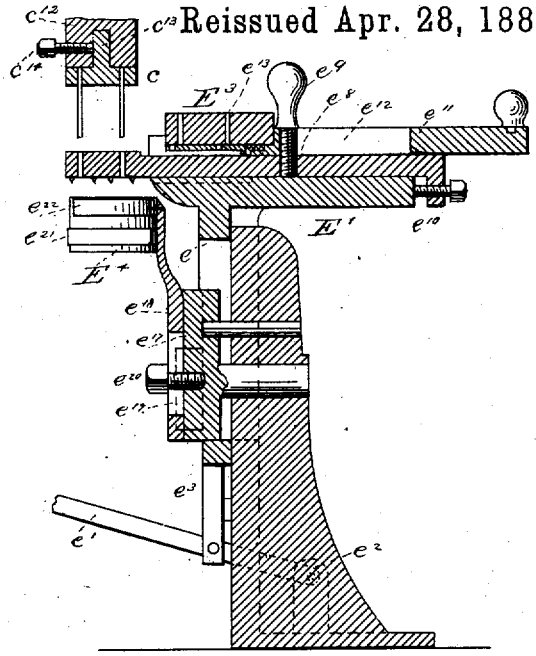
Figure 5:
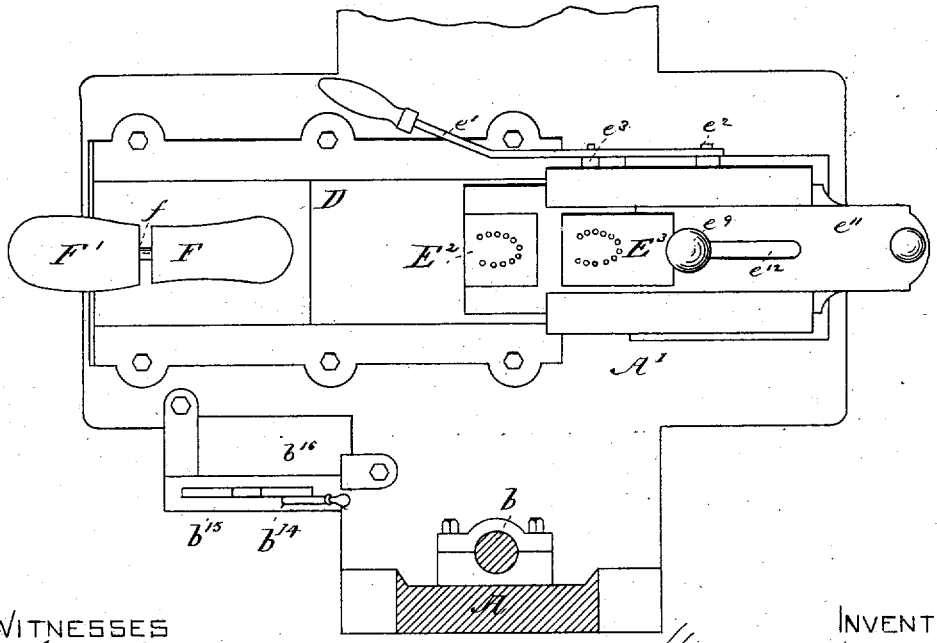
Figure 6:
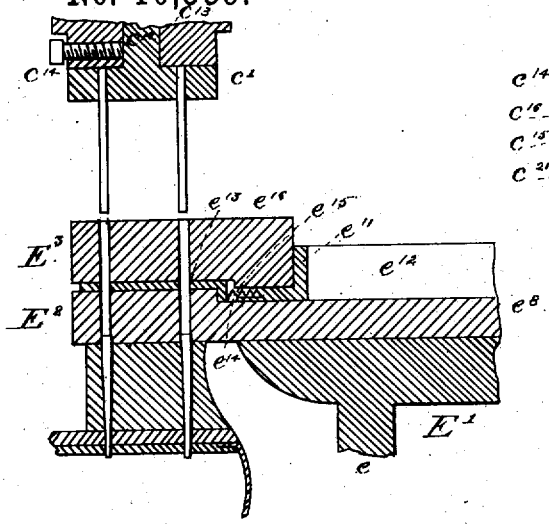
Figure 7:
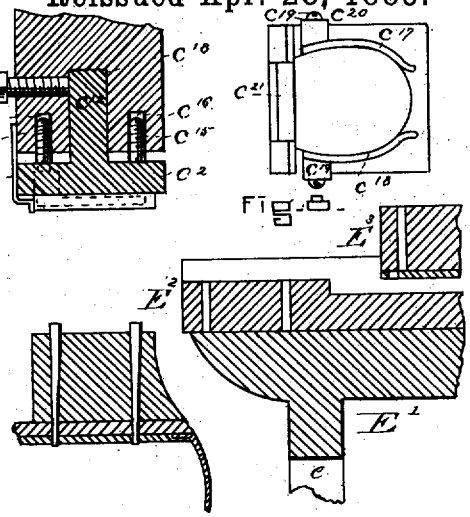
Figure 9:
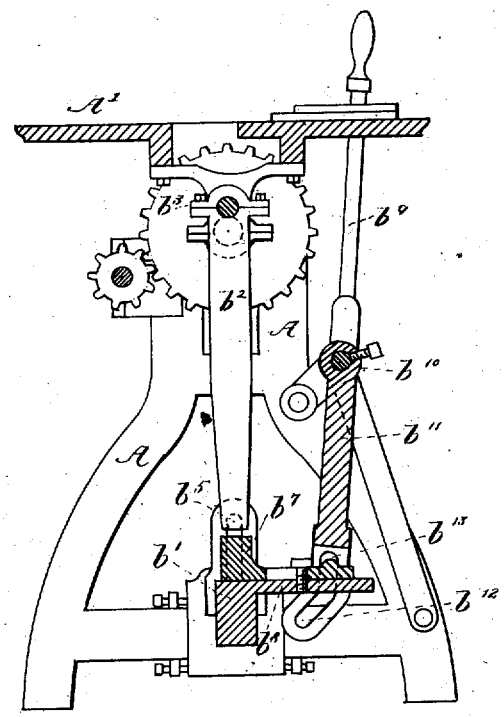

Figure 1 is a front elevation of my machine. Fig. 2 is a view, part in vertical central section and part in elevation, lengthwise of the machine. Fig. 3 is an enlarged view of the heel-receiver, templet, and nail-holder and the manner of supporting the same, hereinafter more fully described. Fig. 4 is a vertical central section of the mechanism shown in Fig. 3, representing the construction. Fig. 5 is a plan view below the line *x x* of Fig. 1. Figs. 6, 7, and 8 are detail views, hereinafter referred to. Fig. 9 is a view, part in section and part in elevation, of the unshipping or stop-motion mechanism.

This invention is an improvement upon that described in my Letters Patent No. 252,215, dated January 10, 1882; and it relates, principally, to improvements in details of construction, rather than to principle.

A is the frame-work of the machine.

B is the cross-head, which is adapted to be reciprocated by means of the rods $b$, the cross-bar $b'$, the connecting-bar $b^2$, the crank $b^3$, and the springs $b^4$. The crank and connecting-bar serve to depress or draw down the cross-head, and the springs to lift it to its original position. I do not, however, confine myself to this method of reciprocating the cross-head; but may use any other suitable mechanism for so doing. The cross-head carries the sliding block or carrier C, to which is screwed or fastened in any other desirable manner the awl-holding block $c$, the driver-holding block $c'$, and the top-lift spanker $c^2$. The block C is moved horizontally on the cross-head to bring the awls, drivers, and spanker successively in place, either directly by hand or by means of a ratchet, $c^3$, bolted to the side of the block, the ratchet-wheel $c^4$, and the hand-wheel $c^5$, and their connecting-shaft.

Upon the upper part of the block C are formed the notches $c^6$, into which the latch $c^7$, which is pivoted to the cross-head and is operated by the handle $c^8$, is adapted to shut automatically when the notch is brought in line therewith, thereby locking the block C to the cross-head and in a position which shall cause the awls, drivers, or top-lift spanker to register.

In order that the sliding block C may be returned rapidly to its original position after the spanking on of the top lift of the heel, or without the latch catching in the notches, I have made the side $c^9$ of the central notch higher than the opposite side, $c^{10}$, so that the latch on the quick movement of the block does not enter the notch, but rides over it and closes on the top of the surface beyond.

The adjustable stop $c^{11}$, attached to the side frame and consisting of a screw, may be used to limit the movement of the sliding block, so that, upon bringing the same in contact therewith, the latch shall enter the notch for registering the awls, and there shall be no liability of the sliding block being moved past it.

Of course I may use other registering mechanism than the device described without departing from the spirit of the invention.

The awl or driver holding plates or blocks are adapted to be removed from the sliding block and others substituted for the purposes of size adjustment, and I represent in Figs. 4 and 6 the awl and driver-blocks provided with a square stud, $c^{12}$, which enters a square hole, $c^{13}$, in their respective supporting portions of the sliding block C, and the locking-screw $c^{14}$, as a means of fastening them in a manner to permit of their quick removal and substitution. The top-lift spanker has a similar construction for the purpose of fastening, and for the purpose of vertical adjustment in relation to its supporting portion of the block C it has the screws $c^{15}$, which are screwed into the screw-holes $c^{16}$, and by means of which, upon releasing the locking-screw $c^{14}$, the position of the spanker in relation to the supporting-block may be changed. In lieu of this method of effecting the vertical adjustment of the spanker, I may use in place of the stud a large screw adapted to swivel in the spanker and screwing into the sliding block, and a disk or wheel interposed between the spanker and the sliding block for operating the screw. In this event simple guide-pins would be substituted for the screws $c^{15}$. Any other manner of adjustment, however, may be employed, and as there are numerous ways well known to mechanics of accomplishing the object, I do not confine myself to the especial means described.

The top-lift spanker has upon its under surface a top-lift holder consisting, essentially, of a spring-clamp adapted to hold the blank by pressure upon the edges, and which is capable of adjustment to varying sizes of lifts. The clamp shown in the drawings comprises the curved spring-arms $c^{17}$ $c^{18}$, which are fastened to the block by the bent arms or supports $c^{19}$ and the adjusting-screws $c^{20}$, the arms being shaped to extend upwardly upon the sides of the spanker-block. I prefer, however, that the arms or supports, instead of being at the front end of the springs, as represented, be near the back, as shown by the dotted lines in Fig. 8, in order that a greater range of automatic adjustment be provided the clamp.

In addition to the spring side clamp there may be used the yielding front gage-plate, $c^{21}$, which is fastened to the block, and extends downwardly to a position in front of the spring-clamp, as shown in Fig. 8.

In lieu of the specific construction described, any suitable lift-clamping mechanism capable of adjustment may be used.

The sliding jack D is like that described in said patent. The adjustable screw-stop $d$ regulates the extent of its inward movement.

Upon the table A of the machine, on a line with the jack and behind it, is the bracket E, which is secured thereto in a manner to permit of its horizontal movement thereon in relation to the jack for the purposes of adjustment. This bracket supports the yielding table E′, upon which the templet $E^2$ and nail-holder $E^3$ are arranged to slide, as hereinafter described, and a heel receiver or guide, $E^4$, for receiving the heel end of the last or other support of the boot or shoe as the jack is moved into position, whereby the heel end of the boot or shoe is caused to assume the proper position in relation to the other operative devices, and for gaging and guiding the placing of the heel-blank.

The yielding table E′ has the vertical plate or standard $e$, which is secured by side gibs to the front of the bracket E in a manner to permit of its vertical movement thereon, and the table is adapted to be lowered or depressed by means of the lever $e'$, pivoted at $e^2$, and an arm, $e^3$, and to be automatically lifted by the coiled spring $e^4$, which surrounds the rod $e^5$, and upon which rod the table moves vertically, or which is fastened to the table and moves vertically with it in a socket at its lower end. A spring-catch, $e^6$, and a latch, $e^7$, (shown in Fig. 2,) serve to lock the table in its lowest position against the stress of the spring. The table carries the sliding plate $e^8$, which is arranged to be moved horizontally to and from the line of reciprocation of the awl in suitable ways or guides by the handle $e^9$, and the adjustable screw-stop $e^{10}$ limits the extent of the forward movement, and any suitable stop the limit of the reverse movement.

At the forward end of the plate is the templet $E^2$. Upon the templet-carrying plate or slide is the sliding plate $e^{11}$, which is arranged to be moved horizontally on the templet-plate. It has the slot $e^{12}$, through which the handle $e^9$ passes, and which, in connection therewith, limits the extent of the movement of the said plate. It supports or carries at its front end the nail-holder $E^3$. The perforated plate $e^3$ is attached to the bottom of the nail-holder, to slide thereon in closing and opening the holes therein, and by means of the projection $e^{14}$ and the spring $e^{15}$ is automatically actuated in the act of moving the nail-holder to and from its position over the templet, the spring moving the plate forward, so that the holes are covered, and a projection upon contact with the edge $e^{16}$ of the templet, acting as a stop in preventing the further movement of the plate, while the nail-holder is still further moved to bring the holes in line with those in the templet. This stopping of the plate of course causes the compression of the spring, and upon the reverse movement of the nail-holder and its plate the spring moves the plate back to its original position to cover the holes.

The front of the plate or standard $e$ has an opening, in which is the block $e^{17}$, which is fastened to the bracket E and supports the heel-receiver arm $e^{18}$. This arm has the slot $e^{19}$, and is fastened to the block by the bolt $e^{20}$, and is thereby made vertically adjustable thereon. The heel-receiver is curved to approximate the contour of the heel, and has fastened to it the yielding curved spring-arms $e^{21}$, which are adapted to embrace the counter of the boot or shoe, and the curved yielding spring-arms $e^{22}$, which are adapted to locate or assist in locating the position of the heel-blank upon the heel of the boot or shoe, and in some instances to grasp and support it thereon during the nailing operation. The lower pair of these yielding arms preferably are attached to the outer ends of the holder, their inner ends being free, while the upper arms are fastened preferably at their rear end to the rear of the holder, leaving the front ends free or in a position to be adjusted horizontally in relation to the sides of the receiver by set-screws.

The start-and-stop-motion mechanism is somewhat different from that described in said patent. The connecting-bar $b^2$ has the pins $b^5$ upon its lower end, which play in vertical slots $b^6$, and thereby guide the movement of the end of the bar, which is constantly reciprocating. The latch $b'$, which forms the operative connection between the end of the bar and the cross-bar, the position of which determines whether the cross-head shall be reciprocated, is moved upon its supporting plate or bed $b^8$ by means of the lever $b^9$, connecting-rod $b^{10}$, and arm $b^{11}$. These parts really constitute a lever, the fulcrum of which is at $b^{10}$.

The lower end of the arm $b^{11}$ has the curved slot $b^{12}$, in which the pin $b^{13}$, forming a part of the latch, projects. The upper part of the slot is vertical and the lower part is curved or inclined inwardly. When the latch is unshipped, it is in the position shown in Fig. 2. The movement of the lever $b^9$ to bring the latch under the connecting-bar moves the lower end of the arm $b^{11}$ to the position shown in Fig. 9, and the downward movement of the latch causes the pin $b^{13}$, moving in the slot $b^{12}$, to throw back the lever $b^9$ to its original position, (see Fig. 2,) where it is locked by springing behind the catch $b^{14}$, (see Fig. 5,) and, upon the upward movement of the latch, the pin traversing the slot from its lowest point draws the latch back from beneath the connecting-rod to its original position. The lever $b^9$ is made to bear against the edge $b^{15}$ of the slot $b^{16}$ in the bed-plate A′, so that it automatically shuts behind the shoulder or catch $b^{14}$.

The work-support consists of the metal heel-piece F and the front piece, F′, which is fastened to the heel-piece by a stud, *f*, upon which it has a slight swiveling movement.

It is intended that the machine be run by a man and a boy, and its operation is as follows: The boot or shoe is adjusted upon the work-support and moved to the receiver and the heel-blank placed in position. The templet-plate is then moved horizontally over the blank, and is then by the lever moved downward thereon and locked automatically in that position. The awls are then brought in line with the templet and the machine put in operation, making one revolution, driving the awls through the templet into the heel-blank and withdrawing them. The awls are then moved, bringing the drivers in position over the templet, and the nail-holder, which has previously been charged with nails, is moved over the templet and the nails discharged into the templet-holes and the holes in the templet-blank. The nail-holder is then withdrawn, and the machine again set in operation, causing the drivers to drive the nails into and through the heel and into the out and in soles, clinching them upon the metallic support. The nail-drivers are then moved and the lift-spanker, which has been provided with a lift, is moved over the heel, the templet is withdrawn, and the machine is again set in operation and the top lift spanked on the heel.

Of course the heel-blank may be compressed during the operation of forming the holes or driving the nails, or by both, and it may be still more compressed upon applying the top-lift, as the nails may be deviecs flush with the top of the heel-blank, and by further compression will still further solidify the heel-blank and cause the tops of the nails to be exposed sufficiently to penetrate and hold it.

It will be noticed that the devices for holding the templet and nail-holder are arranged back of the line of reciprocation of the cross-head, and that the templet has a direct horizontal movement upon its support, and that the nail-holder also has a direct horizontal movement. This arrangement of these parts and manner of operating them is an improvement upon that described in my said Letters Patent, because it brings them where they can be more readily handled by the assistant, and where they are out of the way of the principal operator and are always in view of the assistant.

The lower surface of the templet may have spurs or projections *z*, as represented in Fig. 4, if desired, and I find that it is a convenience to use them, because they close upon and into the upper surface of the heel-blank and hold it firmly and solidly during the driving of the awls and nails. When heel-blanks of comparatively soft or tempered leather are used, or, in fact, any heel-blanks that will permit of it, the awls may be dispensed with and the nails driven through the heel-blank by the drivers without first puncturing it.

In my said Patent No. 252,215 I have shown and described a reciprocating cross-head carrying a gang or group of awls, a gang or group of drivers, and a lift-spanker, which are adapted to be brought successively into proper position in relation to the work, and I therefore simply claim as novel, so far as this feature of the invention is concerned, only the specific means for providing the awls, drivers, and spanker, or two of them, with horizontal movements upon the cross-head; and in this connection it may be stated that as an equivalent for the horizontal movement of the carriage on the cross-head, as herein indicated, the work-support or jack can be moved horizontally into position under the awls, drivers, or spanker, and the latter be stationary upon the cross-head.

Having thus fully described my invention, I claim and desire to secure by Letters Patent of the United States—

1. In an organized heel-nailing machine, the combination of a jack for holding the boot or shoe, the reciprocating cross-head B, and sliding carriage C, adapted to have a straight horizontal movement upon said cross-head imparted to it, and a gang or group of awls and a gang or group of drivers supported by said carriage, all substantially as described.

2. In an organized heel-nailing machine, the combination of a jack for holding and presenting the work to the nailing mechanism, a reciprocating cross-head, B, and a sliding carriage, C, adapted to have a straight horizontal movement upon said cross-head imparted to it, an awl-holding block, *c*, driver-holding block *c′*, and top-lift spanker $c^2$, supported by said caraiage, all substantially as and for the purposes described.

3. In an organized heel-nailing machine, the combination of a jack for presenting the work to the heel-nailing mechanism, the reciprocating cross-head B, the sliding carriage C, adapted to have a horizontal movement upon said cross-head imparted to it, and a driver-holding block, $c'$, and top-lift spanker $c^2$, supported by said carriage, all substantially as and for the purposes described.

4. The combination of the reciprocating cross-head, the sliding block or carriage C, and the adjustable stop $c^{11}$, all substantially as and for the purposes described.

5. The combination of the cross-head B, the carriage C, the hand-wheel $c^5$, and mechanism, substantially as specified, for connecting it with the carriage C, all as and for the purposes set forth.

6. The combination, in an organized heel-nailing machine, of a jack for presenting and holding the work to the heel-nailing mechanism, the table or support E′, the sliding-templet $E^2$, adapted to be moved horizontally in a straight line upon said support into position over the jack, and a gang or group of awls adapted to be reciprocated by means substantially as specified, all as and for the purposes described.

7. The combination, in an organized heel-nailing machine, of a jack for presenting and holding the work to the nailing mechanism, the table or support E′, the templet $E^2$, adapted to be moved horizontally in a straight line upon said support or table into position over the jack, and a gang or group of drivers adapted to be reciprocated by means substantially as specified, all as and for the purposes described.

8. The combination, in an organized heel-nailing machine, of a jack for presenting and holding the work to the nailing mechanism, a support or table, E′, a templet, $E^2$, adapted to be moved horizontally on the said table into position over the jack, a gang or group of awls and a gang or group of drivers interchangeably arranged upon a cross-head, and means for reciprocating said cross-head, all substantially as and for the purposes described.

9. In an organized heel-nailing machine, the combination of a jack for presenting and holding the work to the nailing mechanism, a table or support, E′, a templet, $E^2$, adapted to be moved horizontally in a straight line upon said table or support into a position over the jack, and a nail-holder adapted to be moved horizontally in a straight line into position over the templet, all substantially as and for the purposes described.

10. In an organized heel-nailing machine, the combination of a jack for presenting and holding the work to the heel-nailing mechanism, a table or support, E′, a templet, $E^2$, adapted to be moved horizontally in a straight line upon said table or support into position over the jack, a nail-holder supported by the templet-plate $e^8$, and adapted to have a horizontal movement therewith and to be moved into position over the templet $E^2$ after the templet-plate has come to rest, all substantially as and for the purposes described.

11. In an organized heel-nailing machine, the combination of a jack for presenting and holding the work to the heel-nailing mechanism, the vertically-movable table or support E′, the templet $E^2$, supported by said table and adapted to be moved horizontally thereon in a straight line to a position over the jack, and then to be moved vertically with said support or table, all substantially as and for the purposes described.

12. In an organized heel-nailing machine, the combination of a jack for presenting the work to the heel-nailing machanism, a heel-receiver, and a templet adapted to have horizontal and vertical movements imparted to it, all substantially as and for the purposes specified.

13. The combination of a jack for holding and presenting the work to the heel-nailing mechanism, a heel-receiver, a templet, and a nail-holder adapted to have a horizontal and vertical movement in relation to the heel-receiver, and a group or gang of awls and a group or gang of drivers adapted to be alternately reciprocated in line with the templet, all substantially as and for the purposes described.

14. The combination of the vertically-movable table E′ and templet-plate $e^8$, adapted to slide thereon in a straight line, all substantially as and for the purposes described.

15. The combination of the vertically movable table E′, the templet-plate $e^8$, adapted to slide thereon, and the nail-holder plate $e^{11}$, adapted to slide upon the templet-plate, and means, substantially as specified, for regulating the extent of the movements of said plates, all substantially as and for the purposes described.

16. The combination of the heel-receiver $E^4$, its slotted standard $e^{18}$, the bracket or post E, and set-screw $e^{20}$, all substantially as and for the purposes described.

17. The combination, in a heel-receiver, of the curved spring-arms $e^{21}$, fastened to the outer end thereof, as specified, and the curved spring $e^{22}$, fastened at the back thereof, as specified, all substantially as and for the purposes described.

18. The combination of the reciprocating connecting-rod $b^2$, the cross-bar $b'$, the movable block $b^7$ and its pin $b^{13}$, the slotted arm $b^{11}$, and means for moving and locking the same, all substantially as and for the purposes described.

19. The combination of the horizontally-moving jack D, the heel-receiver $E^4$, a templet adapted to move horizontally and vertically upon the heel-blank to clamp it in position and upon the work, and to lock it in that position prior to the reciprocation of the awls or drivers, and said reciprocating awls or drivers, all substantially as and for the purposes described.

20. The combination, in an organized heel-nailing machine, of a jack for holding and presenting the work to the nailing mechanism, a reciprocating cross-head, B, and a sliding carriage adapted to have a horizontal movement upon said cross-head imparted to it, a gang of awls, a gang of drivers, and a top-lift spanker supported by said carriage or any two of them, and an automatic registering-stop, all substantially as and for the purposes described.

21. The combination, in a heel-nailing machine, of the table E′, depressing-lever $e'$, and link or connection $e^2$, all substantially as described.

22. The combination of the table E′, latch $e^7$, catch $e^6$, and unlatching-lever X, all substantially as described.

23. The combination of the table E′, templet-plate $e^8$, and stop $e^{10}$, substantially as described.

24. In a heel-nailing machine, the nail-holder plate having the slot $e^{12}$, as and for the purposes described.

25. In a heel-nailing machine, a sliding nail-holder plate comprising the slotted portion $e^{12}$ and the removable nail-holder $e^3$, supported or carried at its front end, all substantially as and for the purposes described.

26. The nail-holder plate having the slot $e^{12}$, in combination with the templet having the stud provided with the handle $e^9$, which projects through the slot $e^{12}$, all substantially as and for the purposes described.

27. The combination of the post or bracket E, arranged behind the jack or support for the heel of the boot or shoe, the yielding table E′, supported thereby and having in its upper surface ways or guides for the reception of the sliding plate $e^8$, which plate carries at its front end a templet, E, spring $e^4$, and a stop for limiting the upward movement of the table, all substantially as and for the purposes described.

28. In a heel-nailing machine, the combination of the table E, having guides for directing the horizontal movement of the plate $e^8$, which supports the templet $E^2$, with said plates bolted to the table to lap upon the edge of the plate $e^8$, for fastening the same to the table in a manner to permit of its horizontal movement, all substantially as and for the purposes described.

29. In a heel-nailing machine, the combination of the spanker-supporting arm and means for adjusting the position of the spanker vertically in relation thereto, all substantially as and for the purposes described.

30. The combination, in a top-lift holder, of separate spring-arms $c^{17}$ $c^{18}$, their supporting-blocks $c^{19}$, and the adjusting-screws $c^{20}$, all substantially as and for the purposes described.

31. The combination, in a top-lift holder, of the separate spring-arms $c^{17}$ $c^{18}$, with the gage-plate $c^{21}$, all substantially as and for the purposes described.

32. In a heel-nailing machine, the combination of the heel-spanker with a top-lift holder comprising separate spring-arms $c^{17}$ $c^{18}$, shaped as described, and adapted to be automatically spread or opened and automatically closed upon the edge of the top-lift, all substantially as and for the purposes described.

33. In a heel-nailing machine, the combination of a support for holding the work with the spring or yielding heel-blank-centering arms $e^{22}$, all substantially as and for the purposes described.

34. In a heel-nailing machine, the combination of a support for the work, the yielding heel-blank guides, and means, substantially as specified, for adjusting them vertically in relation to the said support, all substantially as and for the purposes described.

35. The combination, in a heel-nailing machine, of a support for holding the boot or shoe in an inverted position with the yielding spring-guides $e^{21}$, all substantially as and for the purposes described.

36. The combination, in a heeling-machine, of a support for holding the boot or shoe in an inverted position, the yielding shoe-guides $e^{21}$, and the yielding heel-blank guides $e^{22}$, all substantially as and for the purposes described.

37. The combination, in a heel-receiver, of a curved plate or support and the curved yielding spring-arms $e^{22}$, secured thereto, all substantially as described.

38. The combination of the cross-head B, connecting-rods $b$, cross-girth $b'$, spring $b^4$, crank $b^3$, connecting-arms $b^2$, and straps connecting the rod $b$ with the girth $b'$, all substantially as and for the purposes described.

39. The combination, in a heel-nailing machine, of the jack D, carrying a support for the boot or shoe, the table E′, supporting the templet $E^2$, the said templet adapted to be automatically moved vertically to compress the heel-blank upon the sole of the boot or shoe, and an automatic lock adapted to operate to hold the templet upon the heel-blank at the end of the automatic vertical movement thereof, substantially as described.

HENRY A. HENDERSON.

Witnesses:
F. F. RAYMOND, 2d,
FRED. HARRIS.